(12) United States Patent
Koreeda

(10) Patent No.: US 6,958,839 B2
(45) Date of Patent: Oct. 25, 2005

(54) SCANNING OPTICAL SYSTEM

(75) Inventor: Daisuke Koreeda, Tokyo (JP)

(73) Assignee: PENTAX Corporation, Tokyo (JP)

( * ) Notice: Subject to any disclaimer, the term of this patent is extended or adjusted under 35 U.S.C. 154(b) by 691 days.

(21) Appl. No.: 10/142,147

(22) Filed: May 10, 2002

(65) Prior Publication Data
US 2003/0072042 A1 Apr. 17, 2003

(30) Foreign Application Priority Data
May 11, 2001 (JP) ........................................ 2001-141255

(51) Int. Cl.[7] ............................................. G02B 26/08
(52) U.S. Cl. ..................... 359/207; 359/204; 359/216; 347/243; 347/244; 347/259
(58) Field of Search ................................ 359/204–207, 359/216–219, 662; 347/243–244, 259–261

(56) References Cited

U.S. PATENT DOCUMENTS 5,453,870 A * 9/1995 Iima ............................ 359/205
5,541,760 A * 7/1996 Iizuka ......................... 359/207

FOREIGN PATENT DOCUMENTS

| JP | 7-120693 | 5/1995 |
|----|----------|--------|
| JP | 8-122673 | 5/1996 |
| JP | 11287966 | 10/1999 |

* cited by examiner

Primary Examiner—James Phan
(74) Attorney, Agent, or Firm—Greenblum & Bernstein, P.L.C.

(57) ABSTRACT

A scanning optical system is configured to include a light source, an anamorphic optical element, a polygonal mirror, and an imaging optical system. The imaging optical system has a scanning lens including a first lens provided on a polygonal mirror side and a second lens provided on a surface side, and a compensation lens provided on the surface side with respect to the scanning lens, the compensation lens compensating for curvature of field. The scanning lens includes at least one convex surface that has a toric surface having a stronger power in the auxiliary scanning direction than in the main scanning direction. One surface of the compensation lens has an anamorphic aspherical surface, which is a surface whose radius of curvature in the auxiliary scanning direction at a point spaced from the optical axis thereof is determined independently from a cross-sectional shape thereof along the main scanning direction.

18 Claims, 5 Drawing Sheets

FIG. 2
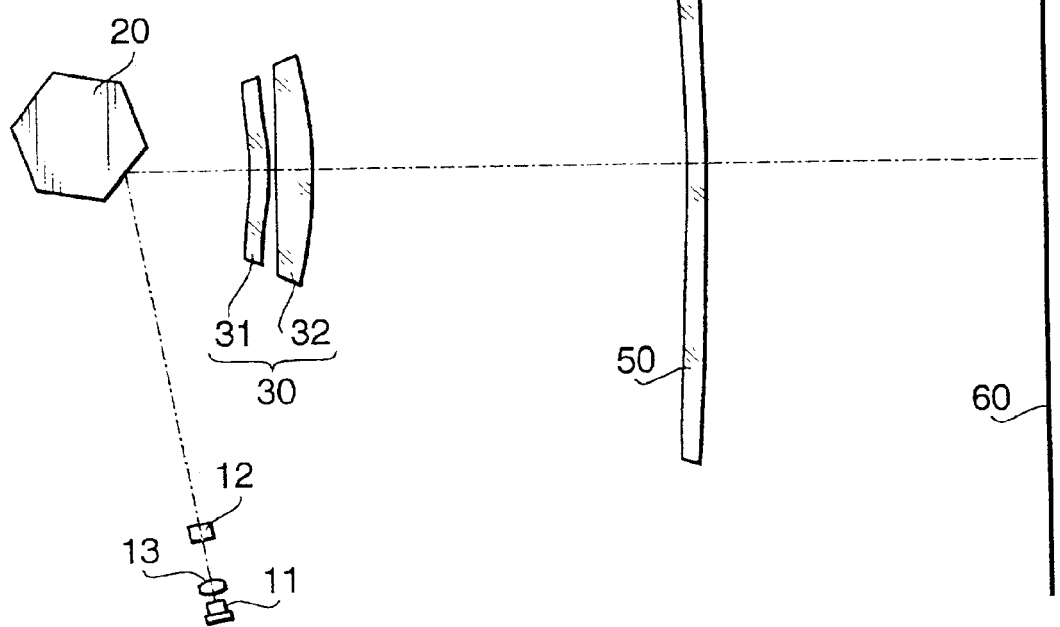
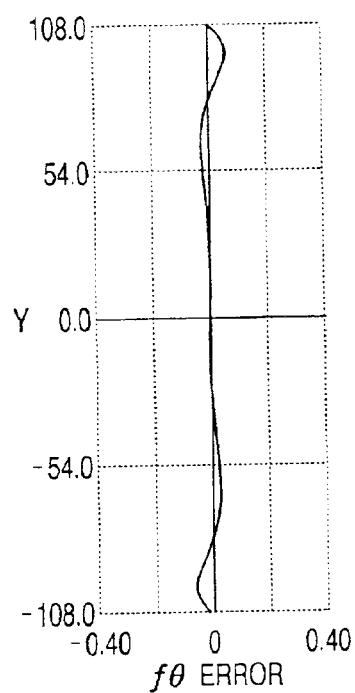
FIG.3A
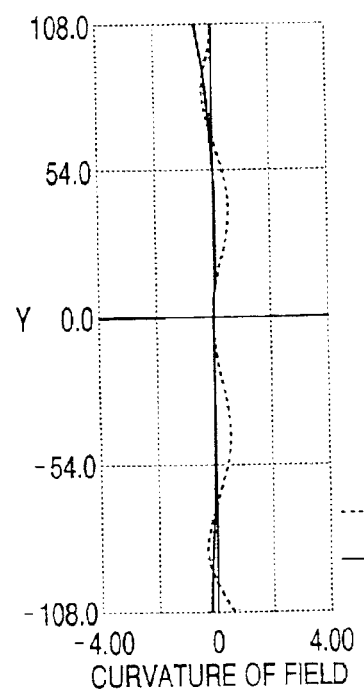
FIG.3B
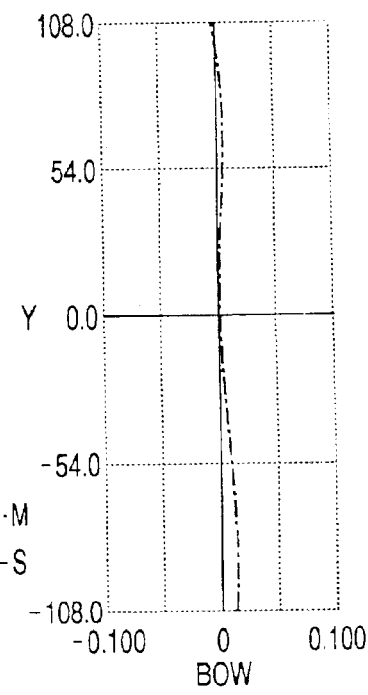
FIG.3C

FIG. 7
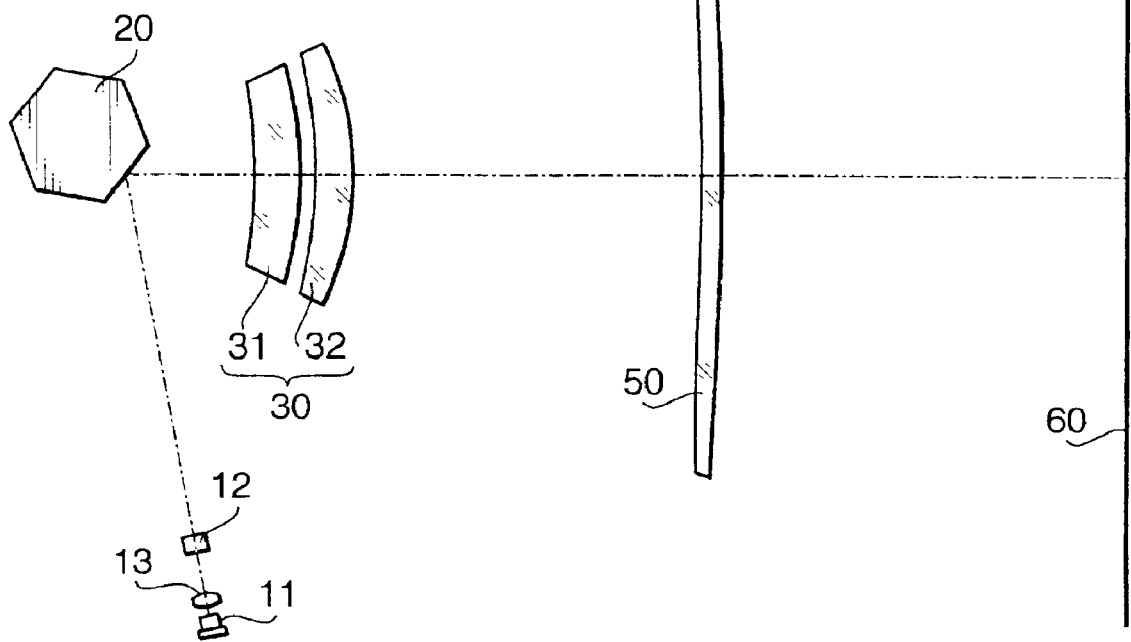
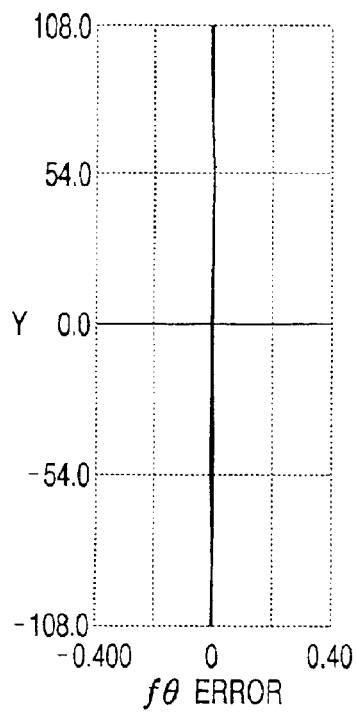
FIG. 8A
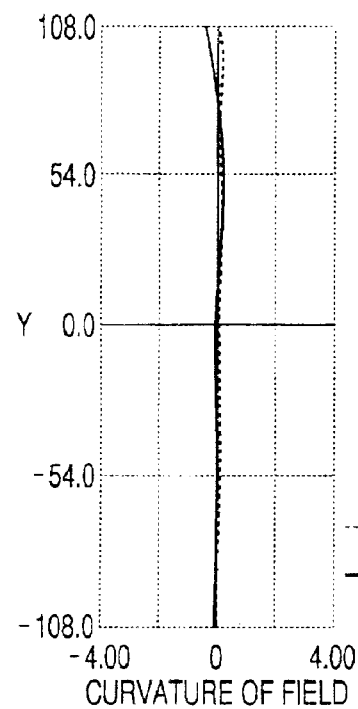
FIG. 8B
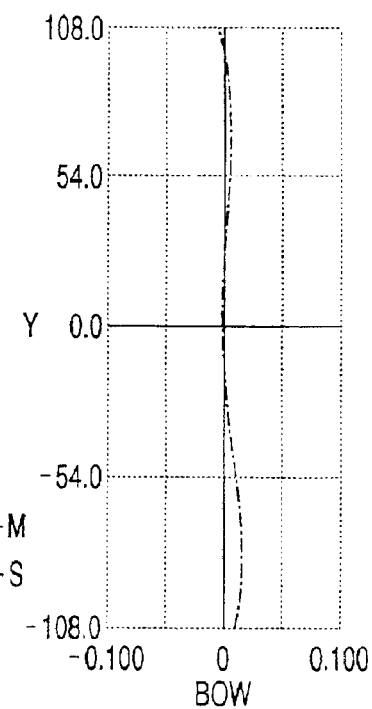
FIG. 8C

SCANNING OPTICAL SYSTEM

BACKGROUND OF THE INVENTION

The present invention relates to a scanning optical system typically employed in a laser beam printer or the like.

In the scanning optical system for the laser beam printer, a laser beam emitted by a laser diode is deflected by a polygonal mirror to scan within a predetermined angular range. The scanning beam passes through an fθ lens, which converges the beam to form a scanning beam spot on a photoconductive surface. As the polygonal mirror rotates, the beam spot moves on the photoconductive surface. By ON/OFF modulating the beam spot as it moves, a electrostatic latent image is formed on the photoconductive drum. Hereinafter, a direction, on the photoconductive surface, in which the beam spot moves as the polygonal mirror rotates is referred to as a main scanning direction, while a direction perpendicular to the main scanning direction, on the photoconductive surface, is referred to as an auxiliary scanning direction.

Further, shape and direction of power of each optical element is described with reference to directions on the photoconductive surface. Further, a plane perpendicular to a rotation axis of the polygonal mirror and including an optical axis of the scanning lens is defined as a main scanning plane.

Sometimes, a multi-beam scanning optical system is configured such that a plurality of beams are deflected simultaneously by a single polygonal mirror. With such a configuration, since a single polygonal mirror is used as a deflector for each of the plurality of beams, the number of optical elements can be decreased, and a room for such elements can be reduced. If the plurality of the beams are respectively inclined in the auxiliary scanning direction, and are incident on substantially the same point on the polygonal mirror, the thickness of the polygonal mirror can be reduced, which reduces a manufacturing cost of the polygonal mirror.

However, if a beam is incident on the polygonal mirror as inclined in the auxiliary direction, a bow occurs, that is, a scanning line, which is defined as a locus of a beam on a surface to be scanned, curves. The bow deteriorates an imaging accuracy and should be suppressed particularly for a high-resolution scanning system.

SUMMARY OF THE INVENTION

One of the advantages provided by the present invention is an optical system in which the bow on the surface to be scanned is suppressed even when a beam incident on the polygonal mirror is inclined in the auxiliary scanning direction.

According to an aspect of the invention, there is provided a scanning optical system for emitting at least one beam which scans in a main scanning direction. The scanning optical system is provided with a light source that emits at least one beam, an anamorphic optical element that converges the at least one beam emitted by the light source in an auxiliary scanning direction which is perpendicular to the main scanning direction, a polygonal mirror that rotates and deflects the at least one beam emerged from the anamorphic optical element to scan in the main scanning direction, an imaging optical system that converges the at least one beam deflected by the polygonal mirror to form at least one beam spot on a surface to be scanned, the at least one beam spot scanning in the main scanning direction on the surface to be scanned.

In the above configuration, the imaging optical system has a scanning lens, and a compensation lens provided on the surface side with respect to the scanning lens, the compensation lens compensating for curvature of field.

Further, the scanning lens includes at least one convex surface that has a toric surface having a stronger power in the auxiliary scanning direction than in the main scanning direction. One surface of the compensation lens has an anamorphic aspherical surface, the anamorphic aspherical surface being defined as a surface whose radius of curvature in the auxiliary scanning direction at a point spaced from the optical axis thereof is determined independently from a cross-sectional shape thereof along the main scanning direction. Furthermore, the anamorphic aspherical surface is configured to satisfy a condition:

$$-1.1 < r_{z2}/r_{z1} < -0.3,$$

wherein, $r_{z1}$ represents a radius of curvature of the toric surface in the auxiliary scanning direction and $r_{z2}$ represents a radius of curvature of the anamorphic surface in the auxiliary scanning direction.

With the above configuration, since the toric surface is employed, curvature of field can be well compensated for.

Optionally, the scanning lens may include a first lens provided on a polygonal mirror side and a second lens provided on a surface side Further, the first lens comprises a plastic lens and the second lens comprises a plastic lens. Alternatively, the second lens may be replaced with a glass lens.

Further optionally, at least one beam may be incident on the polygonal mirror such that the at least one beam is inclined with respect to a main scanning plane that is a plane perpendicular to a rotational axis of the polygonal mirror and including the optical axis of the scanning lens.

In a particular case, the light source may emit a plurality of beams, and at least one of the plurality of beams is inclined with respect to the main scanning plane.

In this case, the plurality of beams may intersect with each other at a point substantially on a reflection surface of the polygonal mirror.

In another case, the light source may emit a plurality of beams, and each of the plurality of beams is inclined with respect to the main scanning plane.

Also in this case, the plurality of beams may intersect with each other at a point substantially on a reflection surface of the polygonal mirror.

It should be noted that the above-described scanning optical system may be employed in various devices such as a laser beam printer.

BRIEF DESCRIPTION OF THE ACCOMPANYING DRAWINGS

FIG. 2 is a top view of the scanning optical system according to a first embodiment;

FIG. 3A is a graph showing an fθ error characteristic according to the first embodiment;

FIG. 3B is a graph showing a curvature of field according to the first embodiment;

FIG. 3C is a graph showing a bow characteristic according to the first embodiment;

FIG. 7 is a top view of the scanning optical system according to a third embodiment;

FIG. 8A is a graph showing an fθ error characteristic according to the third embodiment;

FIG. 8B is a graph showing a curvature of field according to the third embodiment; and FIG. 8C is a graph showing a bow characteristic according to the third embodiment.

DESCRIPTION OF THE EMBODIMENTS

Hereinafter, embodiments according to the invention are described with reference to the accompanying drawings.

Figure 1:
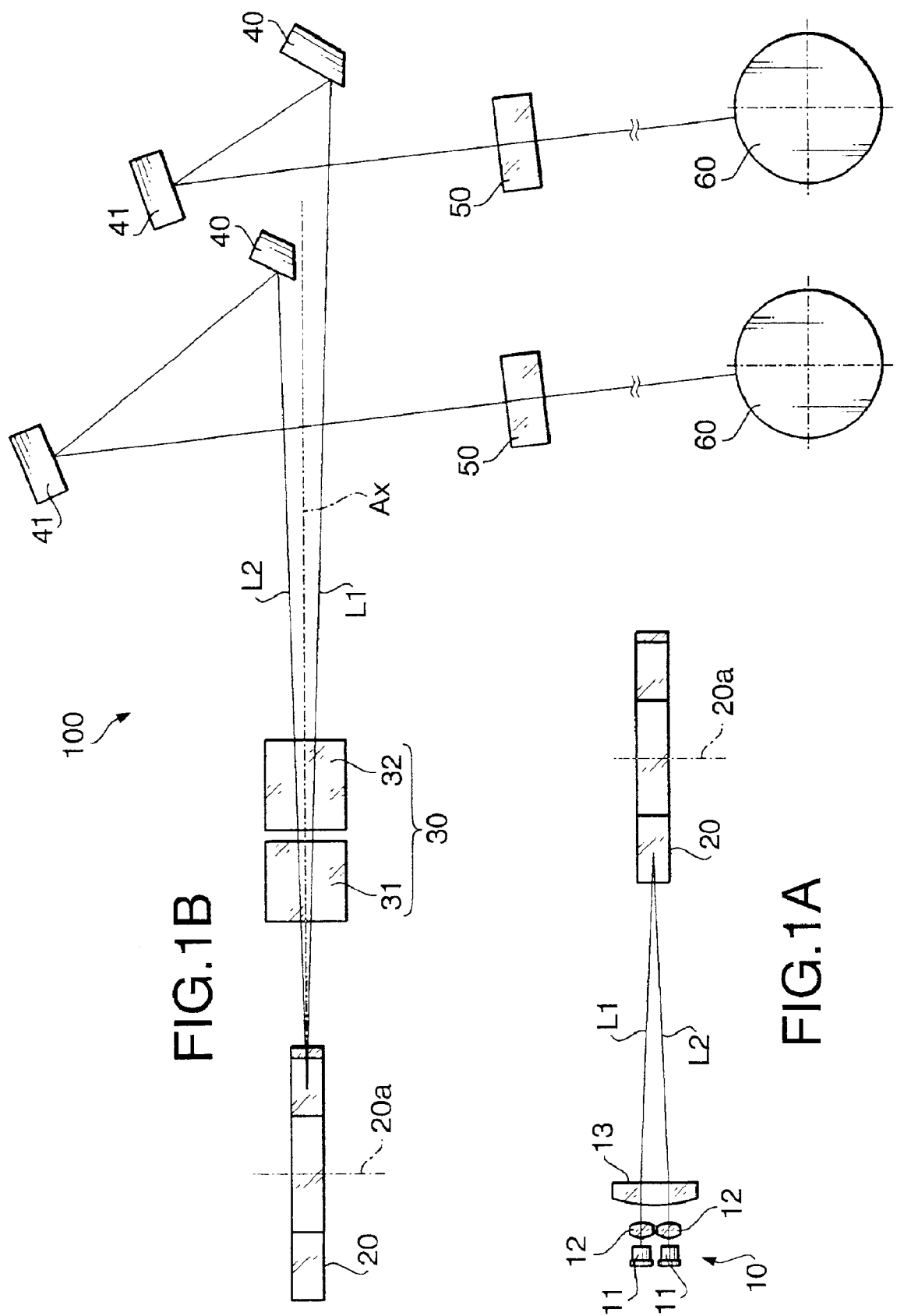
FIG. 1A shows a side view of a light source unit and a polygonal mirror according to embodiments.
FIG. 1B shows a side view of the scanning optical system.

FIG. 1A shows a side view of a light source unit and a polygonal mirror of a so-called tandem scanning optical system to which the present invention is applicable. FIG. 1B shows a side view of the scanning optical system on a photoconductive drum side thereof.

The scanning optical system 100 includes a light source 10, which includes two laser diodes 11 and 11, and two collimating lenses 12 and 12 for collimating divergent beams emitted by the laser diodes 11 and 11, respectively. The two beams L1 and L2 respectively collimated by the collimating lenses 12 and 12 are incident on a cylindrical lens 13. The two collimated laser beams L1 and L2 are incident on the cylindrical lens 13 which has a positive power only in the auxiliary scanning direction. Further, the two beams L1 and L2 are deflected, due to a prism effect of the cylindrical lens 13, and incident on a substantially same position on a reflection surface of a polygonal mirror 20. Due to the refraction power of the cylindrical lens 13, a line-like image, which extends in the main scanning direction, is formed on a plane closely adjacent to a reflection surface of the polygonal mirror 20. Therefore, the two beams emitted by the light source 10 are incident on the polygonal mirror 20 as being inclined with respect to a main scanning plane which is defined as a plane perpendicular to a rotational axis 20a of the polygonal mirror and including an optical axis Ax of a scanning lens 30. The two beams intersect with each other substantially on a reflection surface of the polygonal mirror.

The two beams L1 and L2 emitted by the light source 10 are simultaneously deflected by the polygonal mirror 20 which rotates about the rotational axis 20a. The deflected beams L1 and L2 proceed in different directions in relation to the auxiliary scanning direction at predetermined angles, and enter the scanning lens 30 including a first lens 31 and a second lens 32. Each of the beams emerged from the scanning lens 30 is reflected by a pair of mirrors 40 and 41, converges on a photoconductive surface 60, through a compensation lens 50, to form a beam spot. As the polygonal mirror 20 rotates about the rotational axis 20a, two scanning lines are formed simultaneously on the photoconductive drums 60 and 60, respectively.

The cylindrical lens 13 has a function as an anamorphic optical element that converges a beam emitted by the light source 10 in the auxiliary scanning direction. The scanning lens 30 and the compensation lens 50 function as an imaging optical system that converges the beams reflected by the polygonal mirror on a surface to be scanned to form beam spots scanning in the main scanning direction thereon.

One convex surface included in the scanning lens 30 is a toric surface. Further, a polygonal mirror side surface of the compensation lens 50 is an anamorphic aspherical surface, which does not have a rotational axis, and whose radius of curvature in the auxiliary scanning direction at a position apart from the optical axis is determined independently from the cross-sectional shape thereof at the point in the main scanning direction.

As the toric surface and the anamorphic aspherical surface are included in the scanning lens 30 and the compensation lens 50, respectively, the power distribution in the auxiliary scanning direction can be appropriately designed without affecting the power distribution in the main scanning direction. With this characteristic, a bow of a scanning line, which is phenomenalized as aberration in the auxiliary scanning direction can be well compensated for. Further, the toric surface is formed as a convex toric surface. This is because a convex toric surface can be formed easier on a glass lens than a concave toric surface. In order to form a convex toric surface, a lens is adhered on a rotation plate having a radius equal to the radius of curvature in one of the principal meridian directions, and a grind stone having a concave surface whose radius is equal to a radius of curvature in the other one of the principal meridian direction is contacted on the lens adhered on the rotation plate. A concave toric surface is quite difficult to form.

Further to the above, the toric surface and the anamorphic surface according to the embodiment satisfy the following condition (1).

$$-1.1 < r_{z2}/r_{z1} < -0.3 \tag{1}$$

where, $r_{z1}$ is a radius of curvature of the toric surface in the auxiliary scanning direction; and $r_{z2}$ is a radius of curvature of the anamorphic aspherical surface on the optical axis in the auxiliary scanning direction.

Condition (1) regulates a relationship between the radius of curvature of the toric surface included in the scanning lens 30 and the radius of curvature of the anamorphic aspherical surface included in the compensation lens 50, in the auxiliary scanning direction. If the ratio $r_{z2}/r_{z1}$ is smaller than the lower limit of condition (1), the bow of the scanning line is over-corrected, and the scanning line bends in the opposite direction. If the ratio $r_{z2}/r_{z1}$ is greater than the upper limit of condition (1), the bow of the scanning line is under-corrected.

Hereinafter, three concrete examples of the tandem scanning optical system shown in FIGS. 1A and 1B will be described. It should be noted that, in the following description of the examples, the optical system through which beam L2 passes is shown, and the optical path of the beam L2 is developed, mirrors 40 and 41 being omitted.

First Embodiment

FIG. 2 shows an arrangement of optical elements on a main scanning plane. TABLE 1 indicates a numerical structure of the first embodiment on the photoconductive drum side from the cylindrical lens 13 of the scanning optical system. In TABLE 1, f denotes a focal length of an imaging optical system, Wd denotes a scanning width, λ0 denotes a design wavelength, θi denotes an incident angle. Further, ry denotes a radius (unit: mm) of curvature in the main scanning direction, rz denotes a radius (unit: mm) of curvature in the auxiliary scanning direction. If a surface is rotationally symmetrical, no value is indicated. Further, d denotes a distance between adjacent surfaces on the optical axis, n denotes a refractive index at a design wavelength of 780 nm, and DECZ denotes a decentering amount (unit: mm) of each surface in the auxiliary scanning direction. The incident angle is an angle at which the central axis of each beam from the laser diode forms with respect to the main scanning plane when the beam is incident on the polygonal mirror 20.

In TABLE 1, surfaces #1 and #2 represents the surfaces of the cylindrical lens 13, surface #3 is a mirror surface of the polygonal mirror 20, surfaces #4 and #5 represent the first lens 31 of the scanning lens 30, surfaces #6 and #7 represent the second lens 32, surfaces #8 and #9 represent the compensation lens 50, and surface #10 represent the photoconductive drum 60. In the first embodiment, the first lens 31 is a plastic lens, the second lens 32 is a glass lens, and the convex surface of the second lens is formed as the toric surface.

TABLE 1

| f = 200.0 mm | Wd = 216 mm | λ0 = 780 nm | θi = 1.15° | | |
|---|---|---|---|---|---|
| surface | ry | rz | d | n | DECZ |
| #1 | inf. | 51.08 | 4.00 | 1.51072 | 0.00 |
| #2 | inf. | — | 97.00 | | |
| #3 | inf. | — | 33.00 | | |
| #4 | −77.50 | — | 5.00 | 1.48617 | 0.00 |
| #5 | −69.00 | — | 2.00 | | 0.00 |
| #6 | inf. | — | 10.00 | 1.51072 | 0.00 |
| #7 | −119.00 | −52.60 | 101.50 | | 0.00 |
| #8 | −465.50 | 32.00 | 5.00 | 1.48617 | 0.89 |
| #9 | −979.20 | — | 92.50 | | 0.00 |
| #10 | inf. | — | | | 0.45 |

Surface #1 is a cylindrical surface having a power only in the auxiliary scanning direction. Surfaces #2, #3, #6 and #10 are planar surfaces. Surfaces #4 and #5 are rotationally symmetrical aspherical surfaces. Surface #7 is a toric surface. Surface #8 is an anamorphic aspherical surface that does not have a rotational axis. A radius of curvature of surface #8 in the auxiliary scanning direction at a point apart form the optical axis is determined independently from the cross-sectional shape, at the point, taken along the main scanning plane. Surface #9 is a spherical surface.

The rotationally symmetrical aspherical surface is expressed by following equation.

$$X(h) = \frac{Ch^2}{1 + \sqrt{1 - (1+\kappa)C^2 h^2}} + A_4 h^4 + A_6 h^6 + A_8 h^8$$

In the above equation, X(h) represents a SAG amount which is a distance between a point on the aspherical surf ace at a height of h and a plane tangential to the aspherical surface at the optical axis. C represents a curvature (1/r) on the optical axis. κ represents a conical coefficient, and $A_4$, $A_6$ and $A_8$ are aspherical coefficients of 4th, 6th and 8th orders, respectively. The radii of curvatures of the rotationally symmetrical aspherical surfaces in TABLE 1 are those on the optical axis. Conical coefficients and aspherical coefficients for the surfaces #4 and #5 are indicated in TABLE 2.

TABLE 2

| surface | κ | $A_4$ | $A_6$ | $A_8$ |
|---|---|---|---|---|
| #4 | 0.00 | 7.33 × 10⁻⁶ | −7.04 × 10⁻¹¹ | 0.00 |
| #5 | 0.00 | 6.21 × 10⁻⁶ | 6.75 × 10⁻¹⁰ | 0.00 |

The anamorphic aspherical surface is defined by the following equation.

$$X(Y) = \frac{CY^2}{1 + \sqrt{1 - (1+\kappa)C^2 Y^2}} + A_4 Y^4 + A_6 Y^6 + A_8 Y^8$$

$$\frac{1}{rz(Y)} = \frac{1}{rz0} + B_1 Y^1 + B_2 Y^2 + B_4 Y^4$$

where, X(Y) is a SAG amount which is obtained as a function of a coordinate Y, which represents a distance from the optical axis to a point on a curved line extending along the anamorphic aspherical surface in the main scanning direction and passing the optical axis thereof. The SAG amount X(Y) represents a distance between the point of the anamorphic aspherical surface and a tangential plane to the anamorphic aspherical surface at the optical axis. Further, rz (Y) represents a radius of an arc extending in the auxiliary scanning direction, the arc intersecting the curved line at the point whose coordinate is Y. C represents a curvature (1/r) of the anamorphic aspherical surface on the optical axis. κ represents a conical coefficient, and $A_4$, $A_6$ and $A_8$ are aspherical coefficients of 4th, 6th and 8th orders, respectively. $B_1$, $B_2$ and $B_4$ are coefficients for determining the radius in the auxiliary scanning direction. Values of the coefficients for the surface #8 are indicated in TABLE 3.

TABLE 3

| κ = 0.000 | |
|---|---|
| A4 = 1.46 × 10⁻⁰⁷ | B1 = −2.45 × 10⁻⁰⁶ |
| A6 = −1.33 × 10⁻¹¹ | B2 = −9.56 × 10⁻⁰⁷ |
| A8 = 8.76 × 10⁻¹⁶ | B4 = 1.85 × 10⁻¹¹ |

FIG. 3A is a graph showing an fθ error characteristic (i.e., displacement of a beam spot with respect to a designed position) according to the first embodiment. FIG. 3B is a graph showing a curvature of field according to the first embodiment. In FIG. 3B, a broken line (M) shows the characteristic in the main scanning direction, and a solid line (S) shows the characteristic in the auxiliary scanning direction. FIG. 3C is a graph showing a bow characteristic (i.e., displacement of a beam spot in the auxiliary scanning direction with respect to a designed main scanning line) according to the first embodiment. In each graph, the longitudinal axis represents an image height (unit: mm), and the horizontal axis represents an amount of aberration (unit: mm).

Figure 4:
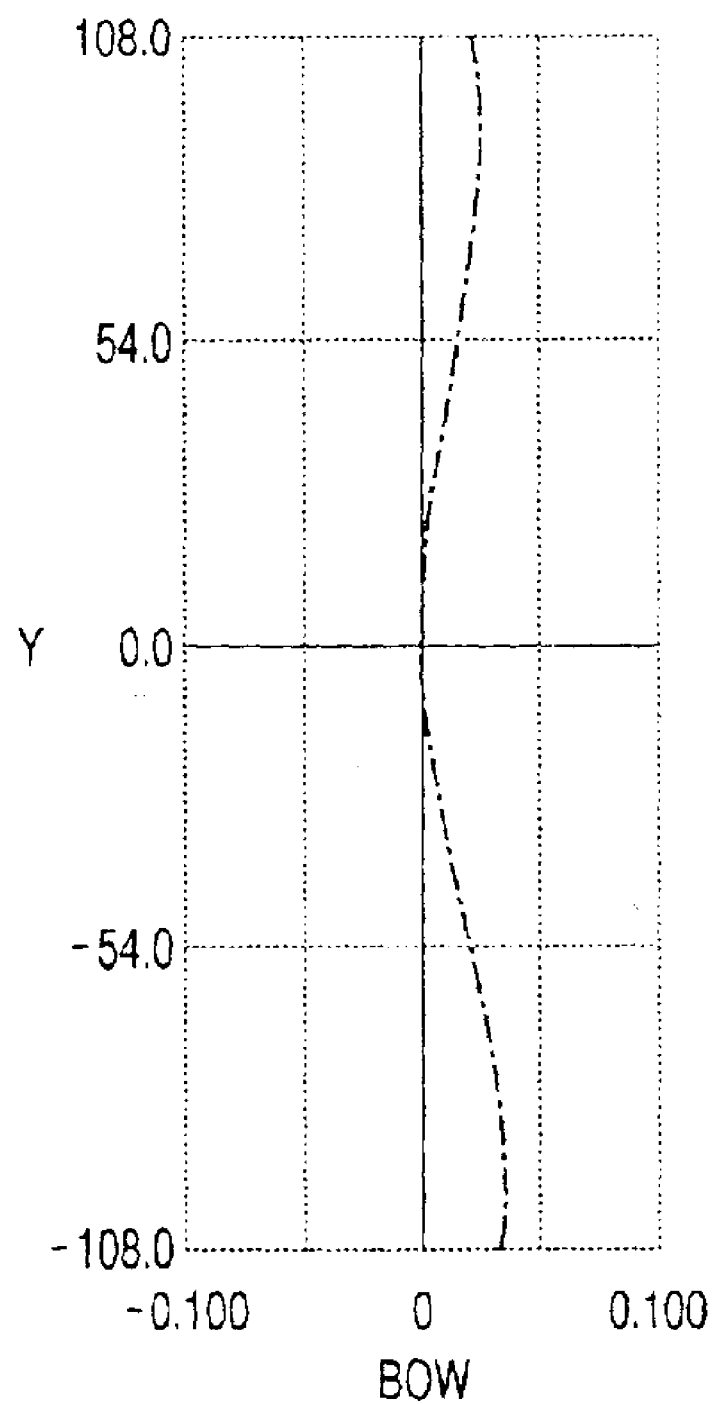
FIG. 4 is a graph showing a bow characteristic of a comparative example which does not employ a toric surface on a scanning lens.

FIG. 4 is a graph showing a bow characteristic of a comparative example which has a similar configuration to the first embodiment except that the toric surface is not formed on the scanning lens. As understood by comparing FIG. 3C with FIG. 4, in the first embodiment, the bow is well compensated for.

Second Embodiment

Figure 5:
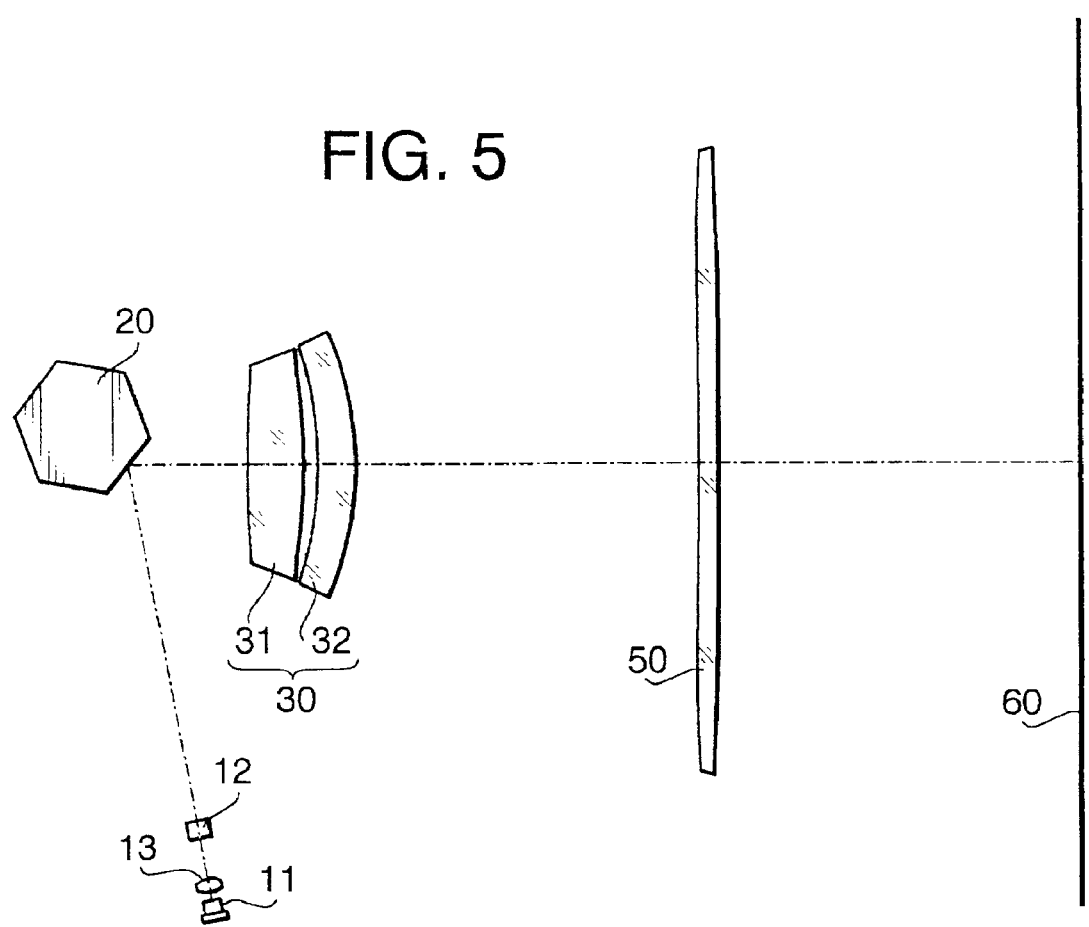
FIG. 5 is a top view of the scanning optical system according to a second embodiment.

FIG. 5 shows an arrangement of optical elements according to the second embodiment. TABLE 4 indicates a numerical structure of the second embodiment on the photoconductive drum side from the cylindrical lens 13 of the scanning optical system according to the second embodiment. In the second embodiment, the first and second lenses 31 and 32 of the scanning lens 30 are plastic lenses, and a convex surface of the second lens 32 is formed as a toric surface.

TABLE 4 f = 200.0 mm　Wd = 216 mm　λ0 = 780 nm　θi = 1.15°

| surface | ry | rz | d | n | DECZ |
|---|---|---|---|---|---|
| #1 | inf. | 51.08 | 4.00 | 1.51072 | 0.00 |
| #2 | inf. | — | 97.00 | | |
| #3 | inf. | — | 33.00 | | |
| #4 | inf. | — | 15.00 | 1.48617 | 0.00 |
| #5 | −102.70 | — | 4.00 | | 0.00 |
| #6 | −85.80 | — | 10.00 | 1.48617 | 0.00 |
| #7 | −80.20 | −49.73 | 92.50 | | 0.00 |
| #8 | −1000.00 | 32.78 | 5.00 | 1.48617 | 1.33 |
| #9 | −2603.60 | — | 98.60 | | 0.00 |
| #10 | inf. | — | | | 0.71 |

Surface #1 is a cylindrical surface having a power only in the auxiliary scanning direction. Surfaces #2, #3 and #10 are planar surfaces. Surfaces #4, #5 and #9 are rotationally symmetrical aspherical surfaces. Surface #6 is a spherical surface. Surface #7 is a toric surface. Surface #8 is an anamorphic aspherical surface that does not have a rotational axis.

Conical coefficients and aspherical coefficients for the surfaces #4, #5 and #9 are indicated in TABLE 5.

TABLE 5

| surface | κ | $A_4$ | $A_6$ | $A_8$ |
|---|---|---|---|---|
| #4 | 0.00 | $2.37 \times 10^{-6}$ | $7.16 \times 10^{-11}$ | 0.00 |
| #5 | 0.00 | $1.87 \times 10^{-6}$ | $5.10 \times 10^{-10}$ | $7.87 \times 10^{-14}$ |
| #9 | 0.00 | $3.56 \times 10^{-9}$ | 0.00 | 0.00 |

Values of the coefficients for the surface #8 are indicated in TABLE 6.

Figure 6A:
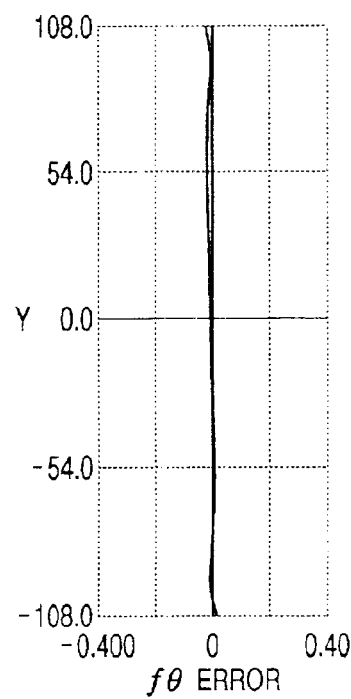
FIG. 6A is a graph showing an fθ error characteristic according to the second embodiment.
Figure 6B:
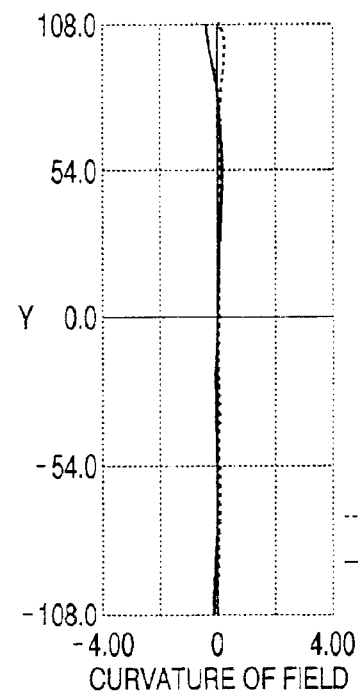
FIG. 6B is a graph showing a curvature of field according to the second embodiment.
Figure 6C:
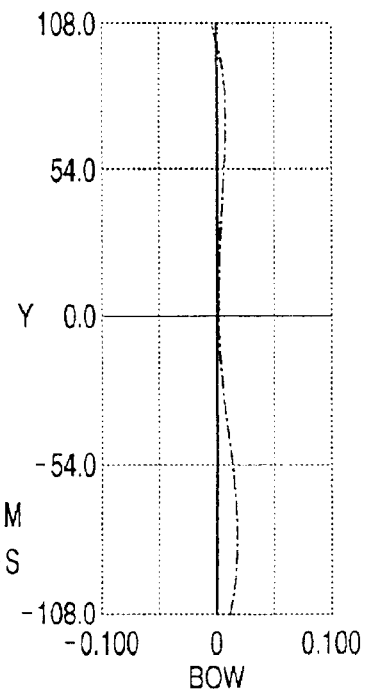
FIG. 6C is a graph showing a bow characteristic according to the second embodiment.

TABLE 6

κ = 0.000
$A_4 = 1.29 \times 10^{-07}$　　$B_1 = -2.23 \times 10^{-06}$
$A_6 = -7.34 \times 10^{-12}$　　$B_2 = -8.51 \times 10^{-07}$
$A_8 = 2.70 \times 10^{-16}$　　$B_4 = 1.95 \times 10^{-11}$ FIG. 6A is a graph showing an fθ error characteristic according to a second embodiment. FIG. 6B is a graph showing a curvature of field according to the second embodiment. In FIG. 6B, a broken line (M) shows the characteristic in the main scanning direction, and a solid line (S) shows the characteristic in the auxiliary scanning direction. FIG. 6C is a graph showing a bow characteristic according to the second embodiment. In each graph, the longitudinal axis represents an image height (unit: mm), and the horizontal axis represents an amount of aberration (unit: mm). As understood from FIG. 6C, the bow is well compensated for in the second embodiment.

Third Embodiment

FIG. 7 shows an arrangement of optical elements according to the third embodiment. TABLE 7 indicates a numerical structure of the third embodiment on the photoconductive drum side from the cylindrical lens 13 of the scanning optical system according to the third embodiment. In the third embodiment, the first and second lenses 31 and 32 of the scanning lens 30 are plastic lenses, and a convex surface of the first lens 31 is formed as a toric surface.

TABLE 7 f = 200.0 mm　Wd = 216 mm　λ0 = 780 nm　θi = 1.15°

| surface | ry | rz | d | n | DECZ |
|---|---|---|---|---|---|
| #1 | inf. | 51.08 | 4.00 | 1.51072 | 0.00 |
| #2 | inf. | — | 97.00 | | |
| #3 | inf. | — | 33.00 | | |
| #4 | −163.50 | — | 12.00 | 1.48617 | 0.00 |
| #5 | −105.00 | −80.24 | 4.00 | | 0.00 |
| #6 | −115.40 | — | 10.00 | 1.48617 | 0.00 |
| #7 | −65.50 | — | 92.50 | | 0.00 |
| #8 | −1002.60 | 33.43 | 5.00 | 1.48617 | 1.33 |
| #9 | −2333.30 | — | 108.07 | | 0.00 |
| #10 | inf. | — | | | 0.88 |

Surface #1 is a cylindrical surface having a power only in the auxiliary scanning direction. Surfaces #2 and #3 are planar surfaces. Surfaces #4 is a spherical surface. Surface #5 is a toric surface. Surfaces #6, #7 and #9 are rotationally symmetrical aspherical surfaces. Surface #8 is an anamorphic aspherical surface that does not have a rotational axis.

Conical coefficients and aspherical coefficients for the surfaces #6, #7 and #9 are indicated in TABLE 8.

TABLE 8

| surface | κ | $A_4$ | $A_6$ | $A_8$ |
|---|---|---|---|---|
| #6 | 0.00 | $9.44 \times 10^{-7}$ | $9.37 \times 10^{-11}$ | $-2.05 \times 10^{-11}$ |
| #7 | 0.00 | $9.05 \times 10^{-7}$ | $2.04 \times 10^{-10}$ | $2.04 \times 10^{-14}$ |
| #9 | 0.00 | $-3.44 \times 10^{-8}$ | 0.00 | 0.00 |

Values of the coefficients for the surface #8 are indicated in TABLE 9.

TABLE 9

κ = 0.000
$A_4 = 9.53 \times 10^{-08}$　　$B_1 = -1.95 \times 10^{-06}$
$A_6 = -8.35 \times 10^{-12}$　　$B_2 = -9.56 \times 10^{-07}$
$A_8 = 3.10 \times 10^{-16}$　　$B_4 = 2.33 \times 10^{-11}$ FIG. 8A is a graph showing an fθ error characteristic according to the third embodiment. FIG. 8B is a graph showing a curvature of field according to the third embodiment. In FIG. 8B, a broken line (M) shows the characteristic in the main scanning direction, and a solid line (S) shows the characteristic in the auxiliary scanning direction. FIG. 8C is a graph showing a bow characteristic according to the third embodiment. In each graph, the longitudinal axis represents an image height (unit: mm), and the horizontal axis represents an amount of aberration (unit: mm). As understood from FIG. 8C, the bow is well compensated for in the third embodiment.

TABLE 10 shows values of the ratio $r_{z2}/r_{z1}$ for the above-described embodiments.

TABLE 10

| | 1st embodiment | 2nd embodiment | 3rd embodiment |
|---|---|---|---|
| $r_{z2}$ | 32.00 | 32.78 | 33.43 |
| $r_{z1}$ | −52.60 | −49.73 | −80.24 |
| $r_{z2}/r_{z1}$ | −0.608 | −0.659 | −0.417 |

As indicated in TABLE 10, in all the embodiments, condition (1) is satisfied.

In the above-described embodiments, only two beams are used. However, the invention is not limited to the configuration described above, and can be modified without departing from the gist of the invention. For example, the number of the beams simultaneously scanned on the surface to be scanned can be three or more. By configuring the optical system such that all the beams intersect substantially on a reflection surface of the polygonal mirror, the thickness (in the rotational axial direction) can remain relatively small. When the thickness of the polygonal mirror is relatively small, torque required for a driving motor that rotate the polygonal mirror can be reduced, and noise generated by the driving motor can be suppressed.

The present disclosure relates to the subject matter contained in Japanese Patent Application No. 2001-141255, filed on May 11, 2001, which is expressly incorporated herein by reference in its entirety.

What is claimed is:

1. A scanning optical system for emitting at least one beam scanning in a main scanning direction, comprising:

a light source that emits at least one beam;

an anamorphic optical element that converges the at least one beam emitted by said light source in an auxiliary scanning direction which is perpendicular to the main scanning direction;

a polygonal mirror that rotates and deflects the at least one beam emerged from said anamorphic optical element to scan in the main scanning direction;

an imaging optical system that converges the at least one beam deflected by said polygonal mirror to form at least one beam spot on a surface to be scanned, said at least one beam spot scanning in the main scanning direction on the surface to be scanned, wherein said imaging optical system has:

a scanning lens; and a compensation lens provided on the surface side with respect to said scanning lens, said compensation lens compensating for curvature of field, wherein said scanning lens having at least one convex surface that has a toric surface having a stronger power in the auxiliary scanning direction than in the main scanning direction, wherein one surface of said compensation lens has an anamorphic aspherical surface, said anamorphic aspherical surface being defined as a surface whose radius of curvature in the auxiliary scanning direction at a point spaced from the optical axis thereof in the main scanning direction is determined independently from a cross-sectional shape thereof along the main scanning direction, said anamorphic aspherical surface satisfying a condition:

$-1.1 < r_{z2}/r_{z1} < -0.3$, wherein, $r_{z1}$ represents a radius of curvature of said toric surface in the auxiliary scanning direction and $r_{z2}$ represents a radius of curvature of said anamorphic surface in the auxiliary scanning direction.

2. The scanning optical system according to claim 1, wherein said scanning lens include a first lens provided on a polygonal mirror side and a second lens provided on a surface side.

3. The scanning optical system according to claim 2, wherein said first lens comprises a plastic lens and said second lens comprises a plastic lens.

4. The scanning optical system according to claim 2, wherein said first lens comprises a plastic lens and said second lens comprises a glass lens.

5. The scanning optical system according to claim 1, wherein the at least one beam is incident on said polygonal mirror such that the at least one beam is inclined with respect to a main scanning plane that is a plane perpendicular to a rotational axis of said polygonal mirror and including the optical axis of said scanning lens.

6. The scanning optical system according to claim 5, wherein said light source emits a plurality of beams, at least one of the plurality of beams is inclined with respect to said main scanning plane.

7. The scanning optical system according to claim 6, wherein the plurality of beams intersect with each other at a point substantially on a reflection surface of said polygonal mirror.

8. The scanning optical system according to claim 5, wherein said light source emits a plurality of beams, each of the plurality of beams is inclined with respect to said main scanning plane.

9. The scanning optical system according to claim 8, wherein the plurality of beams intersect with each other at a point substantially on a reflection surface of said polygonal mirror.

10. A laser beam printer employing a scanning optical system for emitting at least one beam scanning in a main scanning direction, said scanning optical system comprising:

a light source that emits at least one beam;

an anamorphic optical element that converges the at least one beam emitted by said light source in an auxiliary scanning direction which is perpendicular to the main scanning direction;

a polygonal mirror that rotates and deflects the at least one beam emerged from said anamorphic optical element to scan in the main scanning direction;

an imaging optical system that converges the at least one beam deflected by said polygonal mirror to form at least one beam spot on a surface to be scanned, said at least one beam spot scanning in the main scanning direction on the surface to be scanned, wherein said imaging optical system has:

a scanning lens; and a compensation lens provided on the surface side with respect to said scanning lens, said compensation lens compensating for curvature of field, wherein said scanning lens having at least one convex surface that has a toric surface having a stronger power in the auxiliary scanning direction than in the main scanning direction, wherein one surface of said compensation lens has an anamorphic aspherical surface, said anamorphic aspherical surface being defined as a surface whose radius of curvature in the auxiliary scanning direction at a point spaced from the optical axis thereof is determined independently from a cross-sectional shape thereof along the main scanning direction, said anamorphic aspherical surface satisfying a condition:

$-1.1 < r_{z2}/r_{z1} < -0.3$, wherein, $r_{z1}$ represents a radius of curvature of said toric surface in the auxiliary scanning direction and $r_{z2}$ represents a radius of curvature of said anamorphic surface in the auxiliary scanning direction.

11. The laser beam printer according to claim 10, wherein said scanning lens includes a first lens provided on a polygonal mirror side and a second lens provided on a surface side.

12. The laser beam printer according to claim 11, wherein said first lens comprises a plastic lens and said second lens comprises a plastic lens.

13. The laser beam printer according to claim 11, wherein said first lens comprises a plastic lens and said second lens comprises a glass lens.

14. The laser beam printer according to claim 10, wherein the at least one beam is incident on said polygonal mirror such that the at least one beam is inclined with respect to a main scanning plane that is a plane perpendicular to a rotational axis of said polygonal mirror and including the optical axis of said scanning lens.

15. The laser beam printer according to claim 14, wherein said light source emits a plurality of beams, at least one of the plurality of beams is inclined with respect to said main scanning plane.

16. The laser beam printer according to claim 15, wherein the plurality of beams intersect with each other at a point substantially on a reflection surface of said polygonal mirror.

17. The laser beam printer according to claim 14, wherein said light source emits a plurality of beams, each of the plurality of beams is inclined with respect to said main scanning plane.

18. The laser beam printer according to claim 17, wherein the plurality of beams intersect with each other at a point substantially on a reflection surface of said polygonal mirror.

* * * * *